United States Patent Office 2,845,659
Patented Aug. 5, 1958

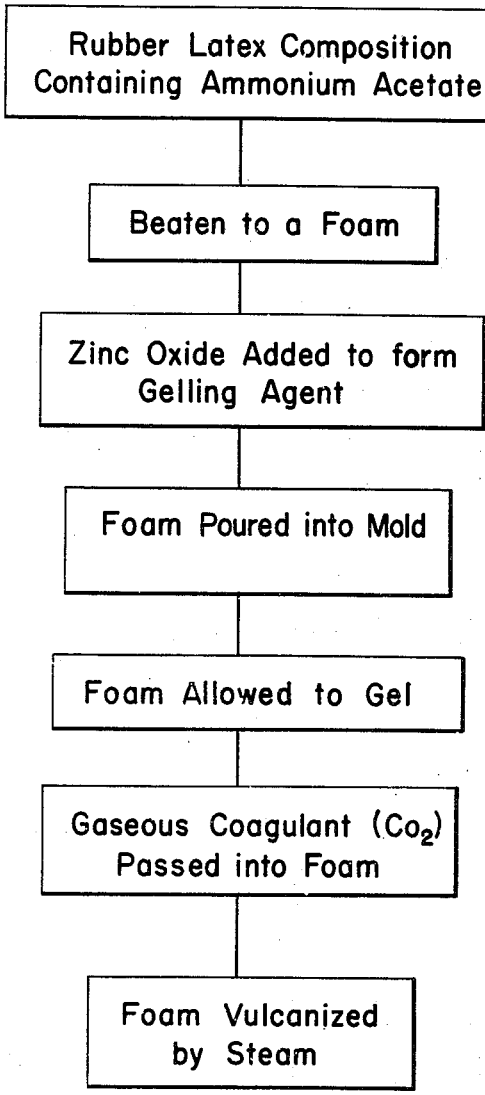

2,845,659

PRODUCTION OF FOAM RUBBER

Kenneth Osborne Calvert, Sutton Coldfield, England, assignor to Dunlop Rubber Company Limited, London County, England, a British company Application October 24, 1955, Serial No. 542,481

6 Claims. (Cl. 18—53)

This invention relates to the production of foam rubber.

Foam rubber can be made from a suitably-compounded vulcanizable rubber latex by various methods in which the latex is foamed, the foam so formed is suitably shaped and then gelled, and the shaped and gelled foam is vulcanized. The various agents that may be used for effecting gelling include delayed-action gelling agents such as sodium silicofluoride, and combinations of zinc compounds with ammonium salts, e. g. zinc oxide with ammonium acetate; the latter may effect gelling either at room temperatures or at somewhat higher temperatures, according to the proportions of the zinc and ammonium compounds present, gelling temperatures of about 25° C. usually being considered desirable.

It has been found that in many cases the step of heating the shaped and gelled foam in order to vulcanize it has the unfortunate effect of causing the vulcanized foam rubber product to be loose or feathery in structure, or even to split, that is to say, to develop fissures. It is an object of the present invention to provide a method of making foam rubber in which looseness of structure and splitting are prevented or at least reduced.

According to the invention, foam rubber is made by a method in which a vulcanizable compounded rubber latex is foamed, the foam so formed is shaped and then gelled by means of a non-gaseous gelling agent, and the shaped and gelled foam is treated with a coagulating gas and vulcanized. The words "coagulating gas" are used in this specification to denote a gas whose properties include that of being able to coagulate rubber latex.

The accompanying drawing, which is self explanatory, shows in flow sheet form the process steps according to this invention.

The invention also includes foam rubber made by a method as specified in the preceding paragraph.

The coagulating gas may be used either alone or in admixture with a non-active gas or gases, such as air or nitrogen. The preferred coagulating gas is carbon dioxide. Treatment with a coagulating gas such as carbon dioxide after gelling has been found to make possible a considerable improvement in the structure of the final vulcanized product.

One method of treating the gelled foam with the coagulating gas consists in placing the foam, in a mould or on a support, in a chamber or vessel in which the coagulating gas is contained. In another method, the coagulating gas is applied to a part or parts of the surface of the body of gelled foam in such a way that the gas is compelled to travel through the interior of the foam. Thus, if the foam is contained in a mould, the surface of the mould may be provided with small holes and the coagulating gas passed in through these holes under slight pressure. Usually the gas pressure that is necessary is very slight indeed, but it will be appreciated that it should in no case be great enough to cause deformation of the foam. Whatever method of treatment is used, the duration of the treatment should be sufficient for the coagulating gas to reach all parts of the body of gelled foam if looseness of the structure and splitting are to be inhibited throughout the foam.

The treatment with the coagulating gas may be carried out before the vulcanization stage, as a step that is quite separate and distinct from the step of vulcanization, or it may instead be carried out while the foam is being heated up for vulcanization or in the early stages of vulcanization.

Any of the non-gaseous gelling agents known in foam rubber technology may be used as the gelling agent in the present method, including those which are used to bring about the gelling of foamed latex at temperatures higher than ordinary room temperatures. The method is however particularly valuable when a mixture of zinc oxide and ammonium acetate is used as a gelling agent at a pH value of about 9.0 to 9.5 as this agent is particularly liable to give unsatisfactory products when used in the normal manner.

The rubber latices which may be used in making foam rubber by the present method include natural latices and synthetic latices such as aqueous dispersions of a polymer of a conjugated diene hydrocarbon, e. g. a polymer of butadiene, or of a copolymer of a conjugated diene hydrocarbon with a second compound polymerizable therewith, e. g. a monomeric compound containing a

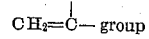

for example acrylonitrile, isobutylene, styrene, methyl methacrylate, or methyl isopropenyl ketone. The synthetic latex may also be an aqueous dispersion of a polymer of chloroprene, or a copolymer of chloroprene with another compound polymerizable therewith. Mixtures of natural latices with such synthetic latices may also be used.

The following examples illustrate the invention. In the examples all the parts given are parts by weight.

*Example 1*

A natural rubber latex containing 60% by weight of rubber hydrocarbon and 0.25% of ammonia was compounded so that it contained, for every 100 parts of rubber, 0.2 part of casein, 2.5 parts of sulphur, 0.5 part of di-beta-naphthyl-para-phenylene-diamine (an antioxidant), 1 part of zinc diethyl dithiocarbamate, and 0.2 part of mercaptobenzthiazole. 1 part of sodium castor-oil soap and 0.5 part of ammonium acetate were then added. The latex was foamed to approximately four times its original volume by beating air into it, and 3 parts of zinc oxide were added. Two similar moulds were filled with the foam, and the foam was allowed to set at 23° C. The foam at this stage was in the state of a weak gel.

The gelled foam in one of the moulds, but not that in the other, was treated with carbon dioxide gas under slight pressure. The carbon dioxide treatment consisted in passing into the foam, through apertures provided in the mould walls, a volume of carbon dioxide which was about three times the bulk volume of the foam, over a period of about 3 minutes.

The two moulds were finally placed in steam at 100° C. and the gelled foam heated for 30 minutes in each case.

After drying, the specimen which had been treated with carbon dioxide before vulcanization had a good uniform sponge structure, but the specimen which had not been so treated had a sponge structure which was internally disrupted.

*Example 2*

A natural rubber latex containing 60% by weight of rubber hydrocarbon and 0.25% of ammonia was compounded as in the previous example except that the additions of sodium castor-oil soap and ammonium acetate were only 0.6 part and 0.1 part respectively. The foam was filled into two similar moulds and gelling of the foam effected by warming at 50° C. for 15 minutes.

The gelled foam in one of the moulds was treated with carbon dioxide gas as in the previous example except that the treatment was extended over a period of about 15 minutes. Vulcanization of the gelled foam in both of the moulds was then effected as before.

The specimen which had been treated with carbon dioxide before vulcanization had a good uniform sponge structure, but the specimen which had not been so treated had a sponge structure which was loose and feathery.

*Example 3*

The procedure followed was similar to that of Example 1 except in that the sodium castor-oil soap addition was 0.6 part and in that 4 parts of para-cresol were used as a gelling agent in the place of the ammonium acetate.

The specimen which had been treated with carbon dioxide before vulcanization had an excellent sponge structure, but the specimen which had not been so treated had a sponge structure which displayed severe internal splitting.

*Example 4*

The latex used in this case was a mixture of natural rubber latex and a butadiene-styrene copolymer; it contained 0.1% of ammonia, and comprised 50 parts of rubber hydrocarbon and 50 parts of butadiene-styrene copolymer. The butadiene-styrene copolymer latex used was a latex available commercially under the designation GR–S latex X–758. To the mixed latex were added 0.1 part of casein, 2.7 parts of sulphur, 0.5 part of di-beta-naphthyl-para-phenylene-diamine (anti-oxidant), 1 part of zinc diethyldithiocarbamate and 0.2 part of mercaptobenzthiazole. 0.7 part of sodium castor-oil soap and 2.0 parts of ammonium acetate were then added. The latex was foamed to approximately five times its original volume by beating air into it, and 3 parts of zinc oxide were added. Two similar moulds were filled with the foam, and the foam was allowed to set at 21° C. The foam at this stage was in the state of a weak gel.

The gelled foam in one of the moulds, but not that in the other, was treated with carbon dioxide gas under slight pressure. The carbon dioxide treatment consisted in placing the mould, which was provided with apertures, in a vessel filled with carbon dioxide gas for a period of 15 minutes.

The two moulds were finally placed in steam at 100° C. and the gelled foam heated for 30 minutes in each case.

The specimen which had been treated with carbon dioxide before vulcanization had a good uniform sponge structure, but the specimen which had not been so treated had a sponge structure which internally was severely disrupted.

Having now described my invention, what I claim is:

1. A method of making foam rubber which comprises foaming a vulcanizable compounded rubber latex, shaping said foamed latex, gelling said shaped foamed latex by means of a non-gaseous gelling agent, treating said gelled, foamed latex with a coagulating gas and vulcanizing said treated foamed latex.

2. The method of claim 1 in which the coagulating gas is carbon dioxide.

3. The method of claim 1 in which gelling is effected by means of a mixture of zinc oxide and ammonium acetate.

4. The method of claim 1 in which the gelled foam is treated by placing the foam in a support in a space containing the coagulating gas.

5. The method of claim 1 in which the coagulating gas is passed through a surface of said foamed latex into the interior thereof and through said foamed latex.

6. The method of claim 1 in which the foam is contained during coagulation in a mold having perforations for the entry of the coagulating gas.

References Cited in the file of this patent
UNITED STATES PATENTS

| | | |
|---|---|---|
| 2,346,055 | Taylor | Apr. 4, 1944 |
| 2,640,036 | Brass | May 26, 1953 |